US007181208B2

(12) United States Patent
Chiba

(10) Patent No.: US 7,181,208 B2
(45) Date of Patent: Feb. 20, 2007

(54) RADIO-COMMUNICATION-ADJUSTABLE APPARATUS, APPARATUS ADJUSTING METHOD, AND APPARATUS ADJUSTING SYSTEM

(75) Inventor: Mitsuru Chiba, Esashi (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/506,179

(22) PCT Filed: Mar. 4, 2003

(86) PCT No.: PCT/JP03/02513

§ 371 (c)(1),
(2), (4) Date: Aug. 31, 2004

(87) PCT Pub. No.: WO03/077289

PCT Pub. Date: Sep. 18, 2003

(65) Prior Publication Data

US 2005/0140518 A1 Jun. 30, 2005

(30) Foreign Application Priority Data

Mar. 12, 2002 (JP) ............................ 2002-067066

(51) Int. Cl.

| | |
|---|---|
| ***H04Q 7/20*** | (2006.01) |
| ***H04M 1/00*** | (2006.01) |
| ***H04M 11/04*** | (2006.01) |
| ***G08G 1/123*** | (2006.01) |
| ***G08B 21/00*** | (2006.01) |
| ***G06F 19/00*** | (2006.01) |

(52) U.S. Cl. ................ 455/426.2; 455/555; 455/404.1; 340/988; 340/679; 700/108

(58) Field of Classification Search ............. 455/426.2, 455/555, 345, 422.1, 569.2, 550.1, 436, 517, 455/404.1, 41.1–41.3, 420, 92; 348/143; 340/988, 679; 380/247, 270; 700/108, 104
See application file for complete search history.

(56) References Cited

U.S. PATENT DOCUMENTS

| | | | | |
|---|---|---|---|---|
| 5,586,030 | A * | 12/1996 | Kemner et al. | 701/23 |
| 2002/0057340 | A1* | 5/2002 | Fernandez et al. | 348/143 |
| 2004/0198306 | A1* | 10/2004 | Singh et al. | 455/345 |
| 2005/0032516 | A1* | 2/2005 | Marchevsky | 455/426.2 |
| 2005/0117750 | A1* | 6/2005 | Rekimoto | 380/247 |

FOREIGN PATENT DOCUMENTS

| | | | |
|---|---|---|---|
| JP | 2000-138700 | A | 5/2000 |
| JP | 2001-338854 | A | 12/2001 |
| JP | 2002-41124 | A | 2/2002 |

* cited by examiner

*Primary Examiner*—Nagmeh Mehrpour
(74) *Attorney, Agent, or Firm*—Crowell & Moring LLP

(57) ABSTRACT

An apparatus adjusting system is provided in which, without setting a terminal apparatus for each apparatus, or providing a connection connector for each apparatus for connecting with a single common terminal apparatus in a switching manner, a mechanism part of an apparatus can be adjusted form a terminal apparatus. An apparatus according to the present invention, includes an adjustable mechanism part (50) and a control part (30) adjusting the mechanism part and a radio communication part (40) establishing radio communication connection with a terminal (2) and carrying out data transmission/reception with the terminal, and the control part includes a data producing part (31) which produces data transmit to the terminal; an analyzing part which analyzes data received from the terminal; and an adjustment part (35) which adjusts the mechanism part based on the data analyzed.

16 Claims, 8 Drawing Sheets

RADIO-COMMUNICATION-ADJUSTABLE APPARATUS, APPARATUS ADJUSTING METHOD, AND APPARATUS ADJUSTING SYSTEM

TECHNICAL FIELD

The present invention relates to an apparatus adjustable with radio communication, an apparatus adjusting method and an apparatus adjusting system.

BACKGROUND ART

Conventionally, for example, in order to adjust a mechanism part of a semiconductor manufacturing apparatus such as a diffusion apparatus, an operation panel of an apparatus body or a terminal apparatus externally connected to the apparatus via a cable is used. For example, in a case of using an adjusting terminal for the mechanism part, the adjusting terminal is provided for each apparatus, or, a connecting connector is provided for each apparatus for connecting from a single common terminal in a switching manner.

However, since the adjusting terminal is not used when the apparatus operates normally, it is useless to provide the number of terminal apparatuses same as the number of the apparatuses in terms of the space and the costs.

Further, in a case of using a common terminal with connector connection, reliability may be degraded such as deterioration of contacts as a result of the connector being inserted and removed repetitively.

Furthermore, when the mechanism part of the apparatus is adjusted with the use of the adjusting terminal connected via a cable, the cable may be troublesome for an operator, or, it may not be possible for the operator to operate the terminal in a free position due to a limitation from a cable length or such.

DISCLOSURE OF THE INVENTION

The present invention has been devised in consideration of the above-mentioned problems, and an object of the present invention is to provide an apparatus adjusting system in which a mechanism part of an apparatus can be operated from a terminal apparatus without providing a terminal apparatus for each apparatus or providing a connecting connector for each apparatus for connecting from a single common terminal apparatus in a switching manner.

In order to achieve the above-mentioned object, in order to operate an apparatus such as a semiconductor manufacturing apparatus or a liquid crystal manufacturing apparatus with the use of a terminal such as an adjusting terminal, a radio communication function is applied between the apparatus and the terminal.

An apparatus provided according to a first aspect of the present invention is an apparatus adjustable with radio communication, having an adjustable mechanism part and a control means connected with and adjusting the mechanism part, wherein:

the apparatus further includes a radio communication means connected with the control means, establishing radio communication connection with a terminal and carrying out data transmission/reception with the terminal; and the control means includes:

a means to produce data to transmit to the terminal;

a means to analyze data received from the terminal; and a means to adjust the mechanism part based on the data analyzed.

An apparatus adjusting system provided according to a second aspect of the present invention has an apparatus including an adjustable mechanism part and a control part to adjust the mechanism part; and a terminal transmitting an instruction to adjust the mechanism part of the apparatus, wherein:

the apparatus further has a radio communication means connected with the control means, establishing radio communication connection with the terminal and carrying out transmission/reception of data to/from the terminal;

the control means has:

a means to produce data to transmit to the terminal;

a means to analyze data received from the terminal; and a means to adjust the mechanism part based on the data analyzed; and the terminal has:

a radio communication means to carry out radio communication with the apparatus; and an interface means displaying data from the apparatus and inputting data to the apparatus.

An apparatus adjusting method provided according to a third aspect of the present invention is an apparatus adjusting method for adjusting an adjustable mechanism part provided in an apparatus from a terminal, and the method has:

a step of transmitting a radio communication connection request message from the terminal to the apparatus;

a step of transmitting a radio communication connection check message from the apparatus to the terminal;

a step of establishing a radio communication connection between the terminal and the apparatus in a one-to-one correspondence relationship;

a step of transmitting a message for an instruction to adjust the mechanism part of the apparatus, from the terminal; and a step of adjusting the mechanism part based on the message for the instruction to adjust, in the apparatus.

An apparatus adjusting method provided according to a fourth aspect of the present invention is an apparatus adjusting method for adjusting of adjustable mechanism parts provided in apparatuses from a terminal, and the method has:

a step of determining an apparatus group comprising a plurality of apparatuses;

a step of transmitting radio communication connection request messages from the terminal to the apparatus group of the plurality of apparatuses;

a step of transmitting radio communication connection check messages from apparatuses of the apparatus group to the terminal;

a step of establishing a radio communication connection between the terminal and the apparatuses of the apparatus group, which have transmitted the radio connection check messages, in a one-to-many correspondence relationship;

a step of transmitting messages for instructions to adjust the mechanism parts of the apparatuses with which radio communication connection has been established, from the terminal; and a step of adjusting the mechanism parts based on the messages for instructions to adjust, in the apparatuses which have received the messages for instructions to adjust.

According to these various aspects of the present invention, since radio communication connection is established between the apparatus and the terminal, it is possible to reduce the required number of terminals to a minimum necessary number, also, a location of using the terminal is not limited by a location at which a connecting connector is provided, and thus, it is possible to improve the efficiency of a work using the terminal.

Other objects, features, functions and advantages of the present invention will become more apparent from the following detailed description when read with reference to the accompanying drawings.

BEST MODE FOR CARRYING OUT THE INVENTION

With reference to the accompanying drawings, embodiments of the present invention are described next. The present invention is not limited to these embodiments, and may be carried out in various modes within the scope of those recited in the claims.

Figure 1:
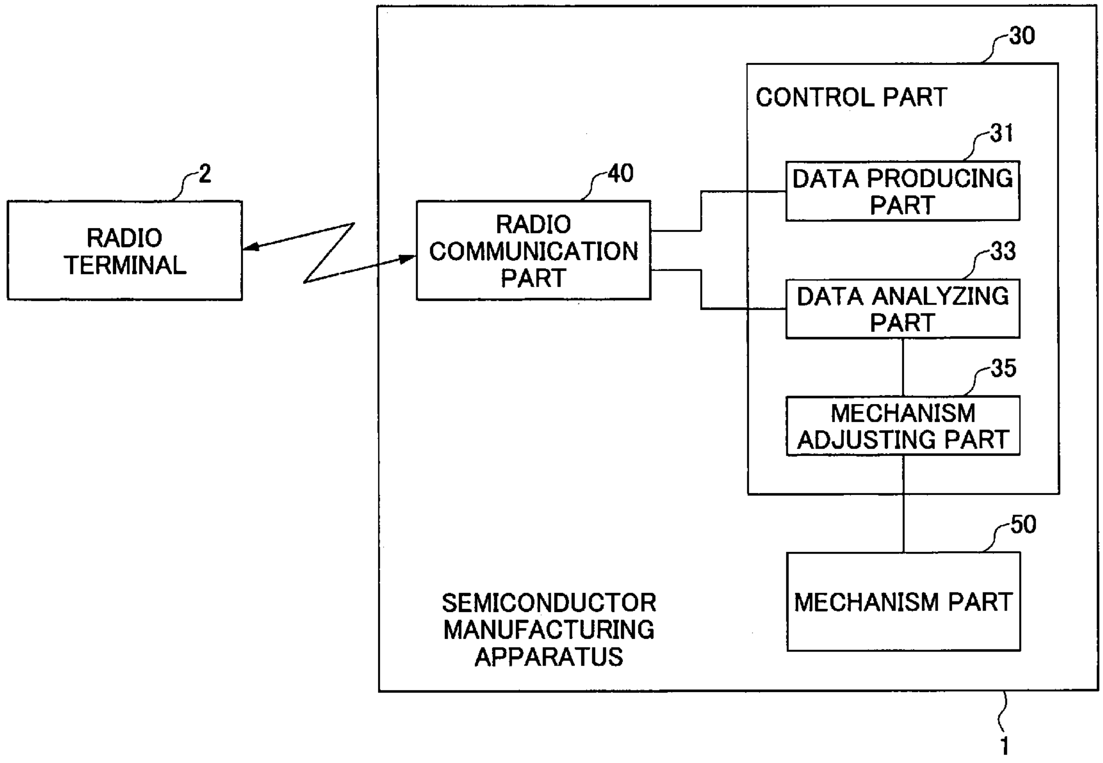
FIG. 1 is a configuration diagram of a semiconductor manufacturing apparatus adjusting system according to a first embodiment of the present invention.

FIG. 1 shows a configuration diagram of a semiconductor manufacturing apparatus adjusting system according to a first embodiment of the present invention. The semiconductor manufacturing apparatus adjusting system in the present embodiment includes a semiconductor manufacturing apparatus 1 and a radio terminal 2 for operating the semiconductor manufacturing apparatus 1. The semiconductor manufacturing apparatus 1 and the radio terminal 2 are configured to carry out radio communication. According to the first embodiment of the present invention, as a radio communication technology, a communication function by Bluetooth having in interface specification of short distance radio communication on the order of 10 m is employed.

The semiconductor manufacturing apparatus 1 is an apparatus used in a process of semiconductor manufacture, such as film producing processing, diffusion processing, etching processing or such. The semiconductor manufacturing apparatus 1 is an apparatus having an adjustable mechanism part 50 and a control part 30 connected with the mechanism part 50 and adjusting the mechanism part 50. The mechanism part 50 is, for example, a transportation system in the semiconductor manufacturing apparatus 1. The radio terminal 2 is used for, for example, operating the mechanism part 50 of the semiconductor manufacturing apparatus 1. More specifically, the radio terminal 2 is used for teaching the transportation system, and, with the use of the radio terminal 2, position of slots or positions of boards may be taught. The radio terminal 2 can be embodied as a PDA terminal having a communication function by Bluetooth, for example.

The semiconductor manufacturing apparatus 1 further has a radio communication part 40 which is connected to the control part 30, establishes connection with the radio terminal 2, and carries out transmission and reception of data to and from the radio terminal 2.

Further, the control part 30 includes a data producing part 31 producing data to transmit to the radio terminal, a data analyzing part 33 analyzing data received from the radio terminal 2, and a mechanism part adjusting part 35 adjusting the mechanism part 50 based on data thus analyzed.

It is possible to simplify a configuration on the side of the radio terminal 2 and to use a general-purpose terminal as the radio terminal in the embodiment of the present invention, as a result of mounting data necessary for the adjustment and conversion functions on the side of the semiconductor manufacturing apparatus 1.

Figure 2:
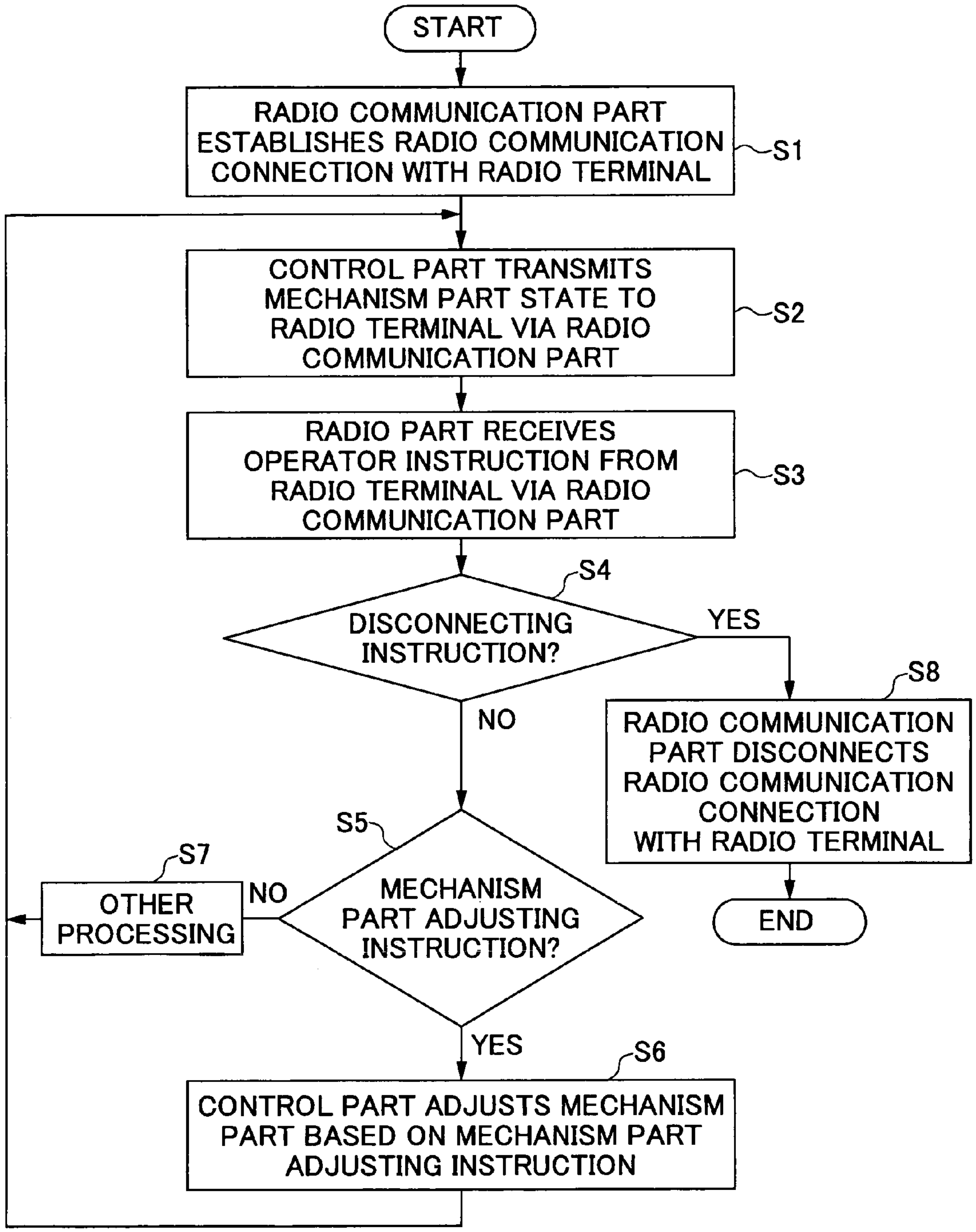
FIG. 2 is a flow chart of a mechanism part adjusting processing according to the first embodiment of the present invention.

Processing of adjusting the mechanism part 50 carried out on the side of the semiconductor manufacturing apparatus according to instructions from the radio terminal 2, according to the first embodiment of the present invention, is described next. FIG. 2 is a flow chart of the mechanism part adjusting processing.

Step 1: The radio communication part 40 establishes radio communication connection with the radio terminal according to a request from the radio terminal 2. Although not shown, when radio communication connection cannot be established, a connection failure is reported to the radio terminal 2.

Step 2: The control part 30 obtains a current state (mechanism part state) of the mechanism part from the mechanism part 50, and, transmits the mechanism part state to the radio terminal 2 via the radio communication part 40.

On the side of the radio terminal 2, the mechanism state is shown in such a manner that an operator may recognize it.

Step 3: The control part 30 receives an operator instruction which is input by the operator from the side of the radio terminal 2.

Step 4: The data analyzing part 33 of the control part 30 determines whether or not the operator instruction received from the radio terminal 2 is a disconnection instruction, and when it is not the disconnecting instruction, Step 5 is carried out. In a case of the disconnection instruction, Step 8 is carried out.

Step 5: The data analyzing part 33 of the control part 30 determines whether or not the operator instruction received from the radio terminal 2 is a mechanism part adjusting instruction, and, when it is the mechanism part adjusting instruction, Step 6 is carried out. When it is not the mechanism part adjusting instruction, Step 7 is carried out.

Step 6: The mechanism part adjusting part 35 in the control part 30 adjusts the mechanism part 50 based on the mechanism part adjusting instruction received from the radio terminal 2, and Step 2 is returned to. A specific example of the adjustment is movement of the transportation system or such.

Step 7: Since the operator instruction from the radio terminal 2 is not the mechanism part adjusting instruction, the control part 30 carries out an appropriate operation according to the operator instruction, for example, reports the mechanism part state or such, and Step 2 is returned to.

Step 8: Since the operator instruction from the radio terminal 2 is the disconnection instruction for the radio communication connection, the radio communication part 40 disconnects the radio communication connection with the radio terminal 2. Thereby, the series of mechanism part adjusting processing is finished.

A configuration is provided such that an instruction to finish the radio communication connection between the semiconductor manufacturing apparatus 1 and the radio terminal 2 may be given from any one of both the semiconductor manufacturing apparatus 1 and the radio terminal 2.

A semiconductor manufacturing apparatus adjusting system according to a second embodiment of the present invention in which a connection state display function, a connection state check function and an emergency stop function are added to the semiconductor manufacturing apparatus adjusting system according to the first embodiment of the present invention mentioned above is described next.

Figure 3:
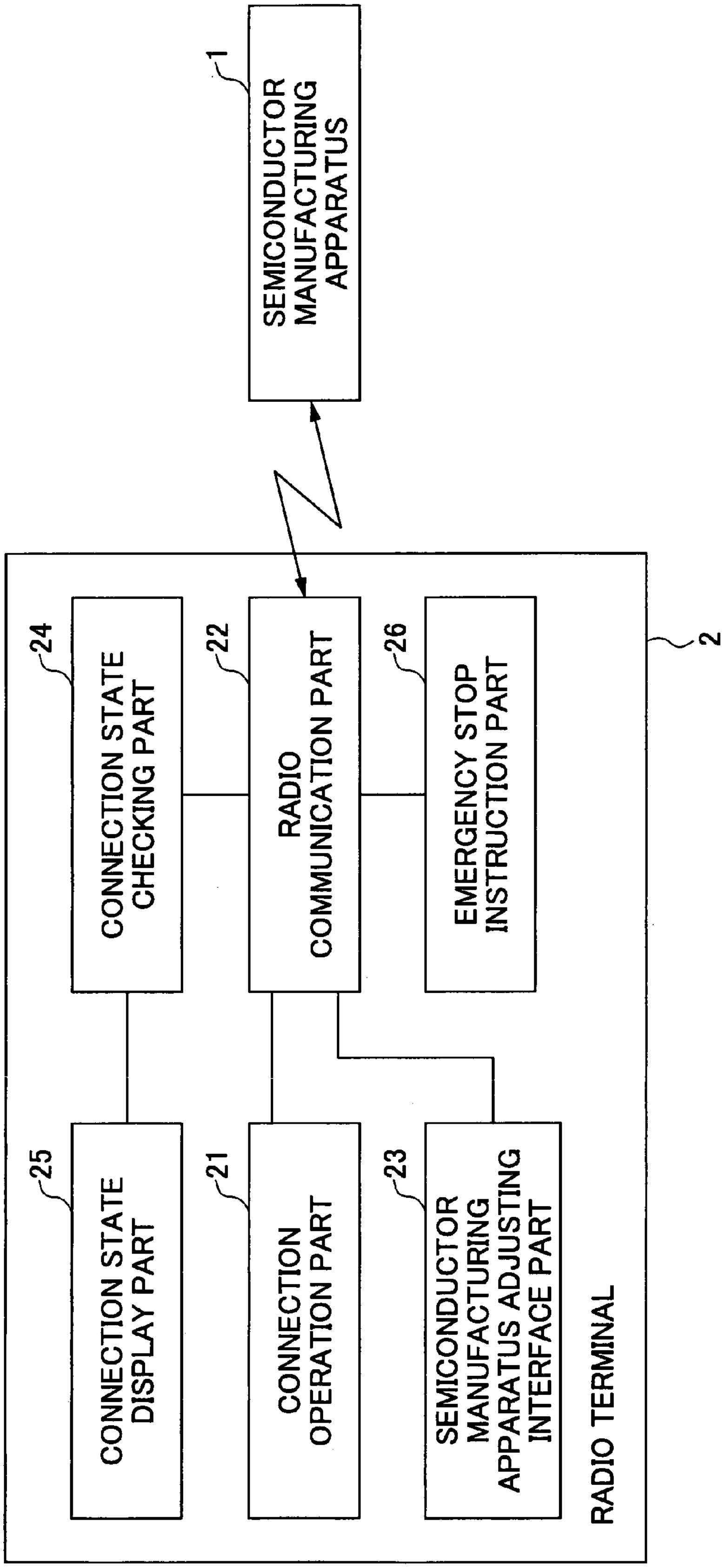
FIG. 3 is a configuration diagram of a radio terminal according to a second embodiment of the present invention.

FIG. 3 is a configuration diagram of a radio terminal 2 in the second embodiment of the present invention. As shown, the radio terminal 2 has a radio communication part 22 carrying out radio communication with a semiconductor manufacturing apparatus 1, and a connection operation part 21 receiving an instruction from an operator, and issuing a connection request, a disconnection request or such according to the operator instruction, to the radio communication part 22. Further, the radio terminal 2 includes a semiconductor manufacturing apparatus adjusting interface 23 issuing a mechanism part adjusting instruction to the semiconductor manufacturing apparatus 1 via the radio communication part 22 after radio communication connection is established with the semiconductor manufacturing apparatus 1. This semiconductor manufacturing apparatus adjusting interface 23 includes, for example, a user interface function (a general viewer) carrying out a browser function.

Further, the radio terminal 2 has a connection state checking part 24 exchanging messages for connection check mutually with the semiconductor manufacturing apparatus 1, for example, at fixed intervals, via the radio communication part 22, and a connection state display part 25 displaying that radio communication connection is made between the semiconductor manufacturing apparatus 1 and the radio terminal 2.

Further, the radio terminal 2 includes an emergency stop instruction part 26 carrying out emergency stop of operation of the mechanism part 50 of the semiconductor manufacturing apparatus 1 depending on a state on the side of the radio terminal 2 in order to ensure safety operation of the semiconductor manufacturing apparatus 1. The emergency stop instruction part 26 is connected with sensors monitoring and detecting emergency situations such as a state in which an operator removes his or her hand from the terminal apparatus 2, a state in which the operator strongly grasps the terminal apparatus 2, a state in which a cable of the terminal apparatus 2 is removed from a socket, and so forth, and, in response to detection signals from these sensors, the emergency stop instruction part 26 transmits an emergency stop signal to the semiconductor manufacturing apparatus 1. The emergency stop signal may be transmitted via the radio communication part 22. However, it is not necessary to limit to this example, and various well-known means to generate an emergency stop signal may be utilized.

The emergency situations with which the emergency stop instruction part 26 generates the emergency stop signal are not limited to these examples. Situations such as an occasion in which checking a connection state with the semiconductor manufacturing apparatus 1 is failed, an occasion in which the radio terminal 2 is moved outside of an electric wave area of the semiconductor manufacturing apparatus 1, an occasion in which the power supply to the radio terminal 2 is turned off, an occasion in which an emergency stop button of the radio terminal is pressed, an occasion in which radio communication connection is cancelled from the side of the radio terminal 2, or such, may be considered.

Figure 4:
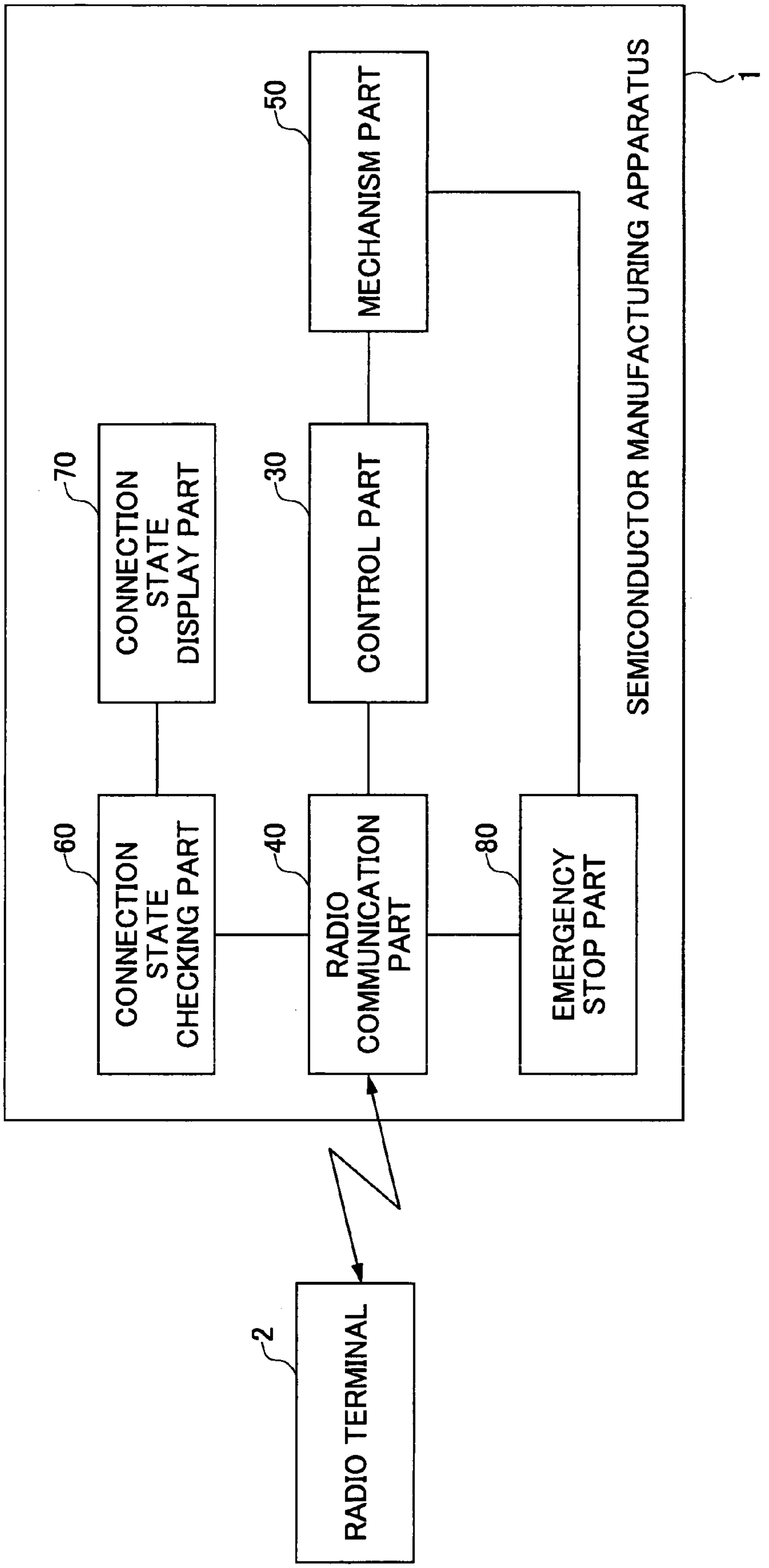
FIG. 4 is a configuration diagram of a semiconductor manufacturing apparatus according to the second embodiment of the present invention.

FIG. 4 shows a configuration diagram of the semiconductor manufacturing apparatus according to the second embodiment of the present invention suitable to the radio terminal 2 shown in FIG. 3. The semiconductor manufacturing apparatus 1 includes, other than the radio communication part 40, the control part 30 and the mechanism part 50 described for the first embodiment of the present invention, a connection checking part 60, a connection state display part 70 and an emergency stop part 80.

The connection state checking part 60 exchanges messages for connection check mutually with the radio terminal 2, for example, at fixed intervals, via the radio communication part 40, and the connection state display part 70 displays that radio communication connection is made with the semiconductor manufacturing apparatus 1.

The emergency stop part 80 is directly connected with the mechanism part 50, and immediately stops operation of the mechanism part 50 in response to the emergency stop signal transmitted from the radio terminal 2.

Hereinbelow, two types of connecting methods carried out between the semiconductor manufacturing apparatus 1 and the radio terminal 2 based on the semiconductor manufacturing apparatus adjusting system according to the first or the second embodiment of the present invention are described.

Figure 5:
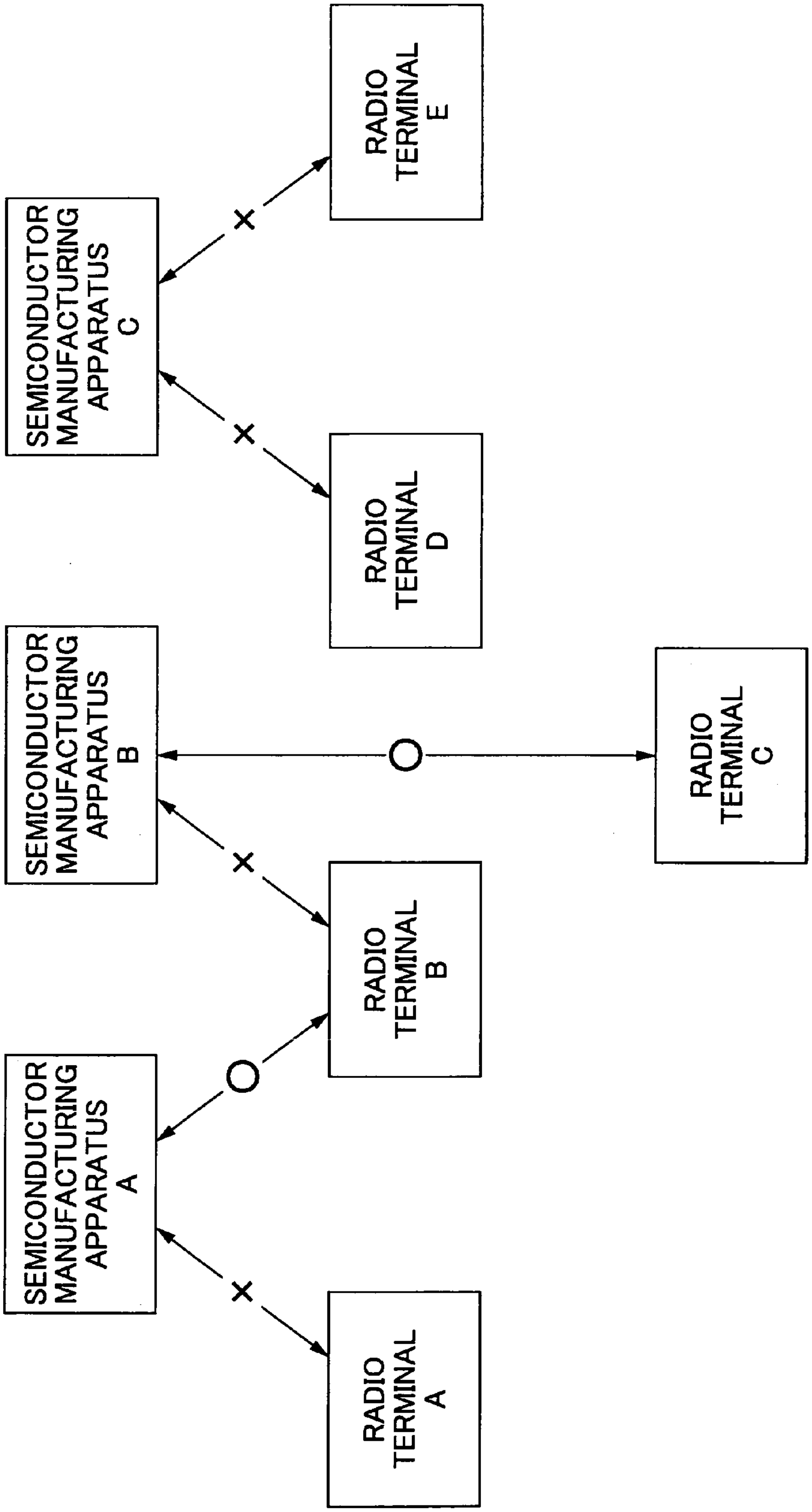
FIG. 5 illustrates an exclusive connecting method according to a third embodiment of the present invention.

FIG. 5 illustrates an exclusive connecting method according to a third embodiment of the present invention. The exclusive connecting method is a connecting method in which the radio terminal 2 selects a specific semiconductor manufacturing apparatus 1. As shown, semiconductor manufacturing apparatuses and radio terminals can be connected only in one-to-one relationships simultaneously. In FIG. 5, an indication of ←○→ denotes a state in which radio communication connection is established (or the establishment is permitted) between the semiconductor manufacturing apparatus and the radio terminal. An indication of ←X→ denotes a state in which establishment of radio communication connection is not permitted.

In this example, since the semiconductor manufacturing apparatus A is connected with the radio terminal B, connection of the radio terminal A with the semiconductor manufacturing apparatus A is not permitted. Since radio communication connection is established between the radio terminal B and the semiconductor manufacturing apparatus A, connection of the radio terminal B with the semiconductor manufacturing apparatus B is not permitted. The semiconductor manufacturing apparatus C is connected neither with the radio terminal D nor with the radio terminal E.

In the exclusive connecting method, first, by an operation on the side of the radio terminal 2, for example, address designation or such, the specific semiconductor manufacturing apparatus 1 is designated. Next, by an operation on the side of the semiconductor manufacturing apparatus 1, an operation to identify the semiconductor manufacturing apparatus 1 thus selected, for example, ID exchange or such, is carried out. Then, once the identification operation is normally carried out, radio communication connection between this radio terminal 2 and another semiconductor manufacturing apparatus 1 is inhibited after that.

Figure 6:
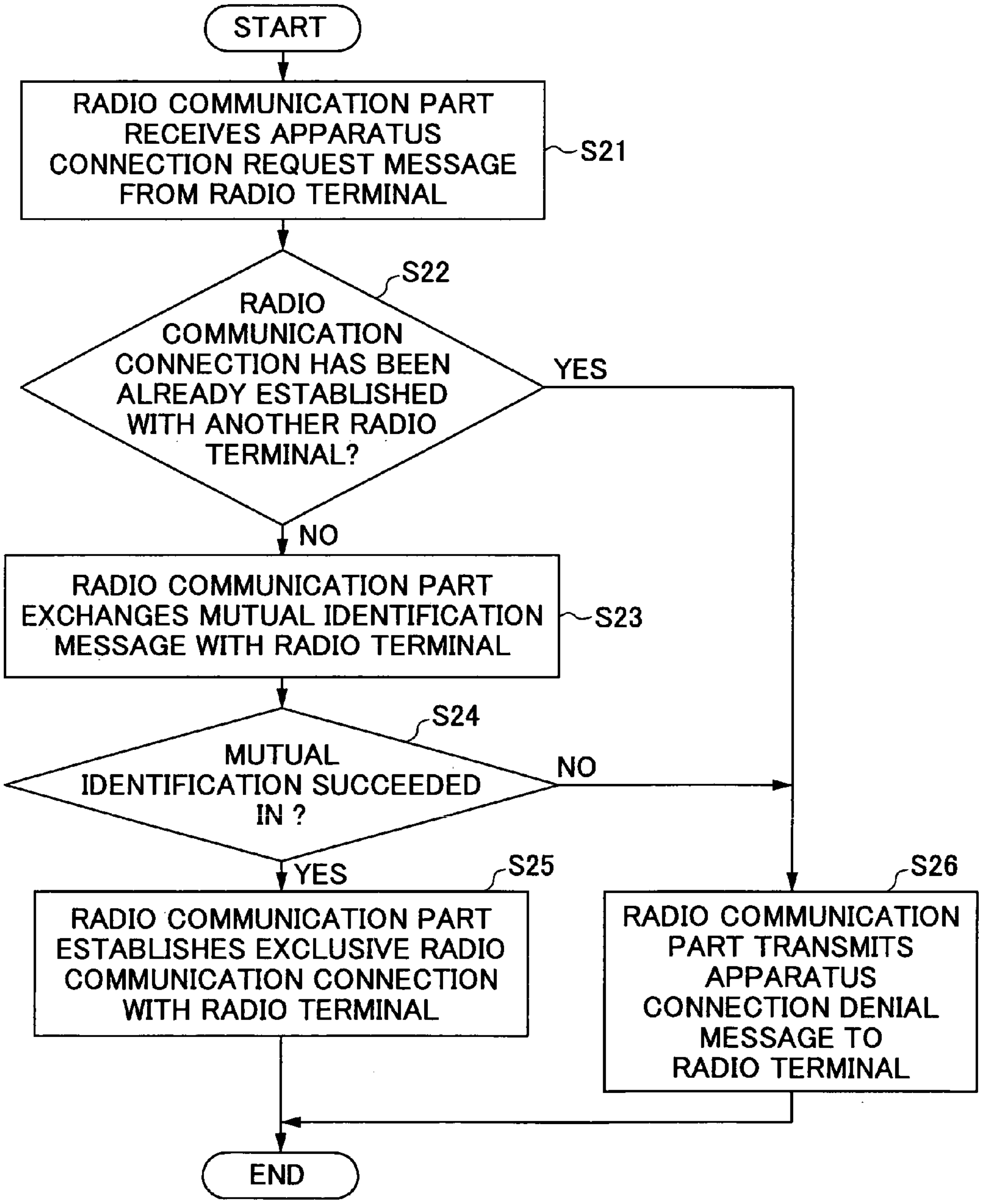
FIG. 6 is a flow chart of exclusive connecting processing according to the third embodiment of the present invention.

FIG. 6 is a flow chart of exclusive connecting processing according to the third embodiment such as that described above.

Step 21: The radio communication part 40 of the semiconductor manufacturing apparatus 1 receives an apparatus connecting request message from the radio terminal 2.

Step 22: The radio communication part 40 checks as to whether or not radio communication connection has been already established with another radio terminal. When connection has been already established with another radio terminal, Step 26 is carried out. When the radio communication part 40 has not established connection with a radio terminal yet, Step 23 is carried out.

Step 23: The radio communication part 40 exchanges mutual identification messages (for example, ID) with the radio terminal which has issued the apparatus connecting request message.

Step 24: The radio communication part 40 determines whether or not the mutual identification with the radio terminal 2 is succeeded in. When the mutual identification is failed, Step 26 is carried out. When the mutual identification is succeeded in, Step 25 is carried out.

Step 25: The radio communication part 40 establishes executive radio communication connection with the radio terminal 2. Thereby, it becomes possible to adjust the mechanism part 50 of the semiconductor manufacturing apparatus 1 from the radio terminal 2.

Step 26: Since exclusive radio communication connection cannot be established with the radio terminal 2, the radio communication part 40 returns an apparatus connection denial message to the radio terminal 2.

After the operation from the radio terminal 2 is completed, the radio communication connection can be disconnected (canceled) from the side of the radio terminal 2 or from side of the semiconductor manufacturing apparatus 1.

The exclusive connecting processing according to the third embodiment of the present invention is carried out according to the above-described procedure. Such an exclusive connecting method is especially advantageous for adjusting operation such as teaching of the mechanism part 50.

Figure 7:
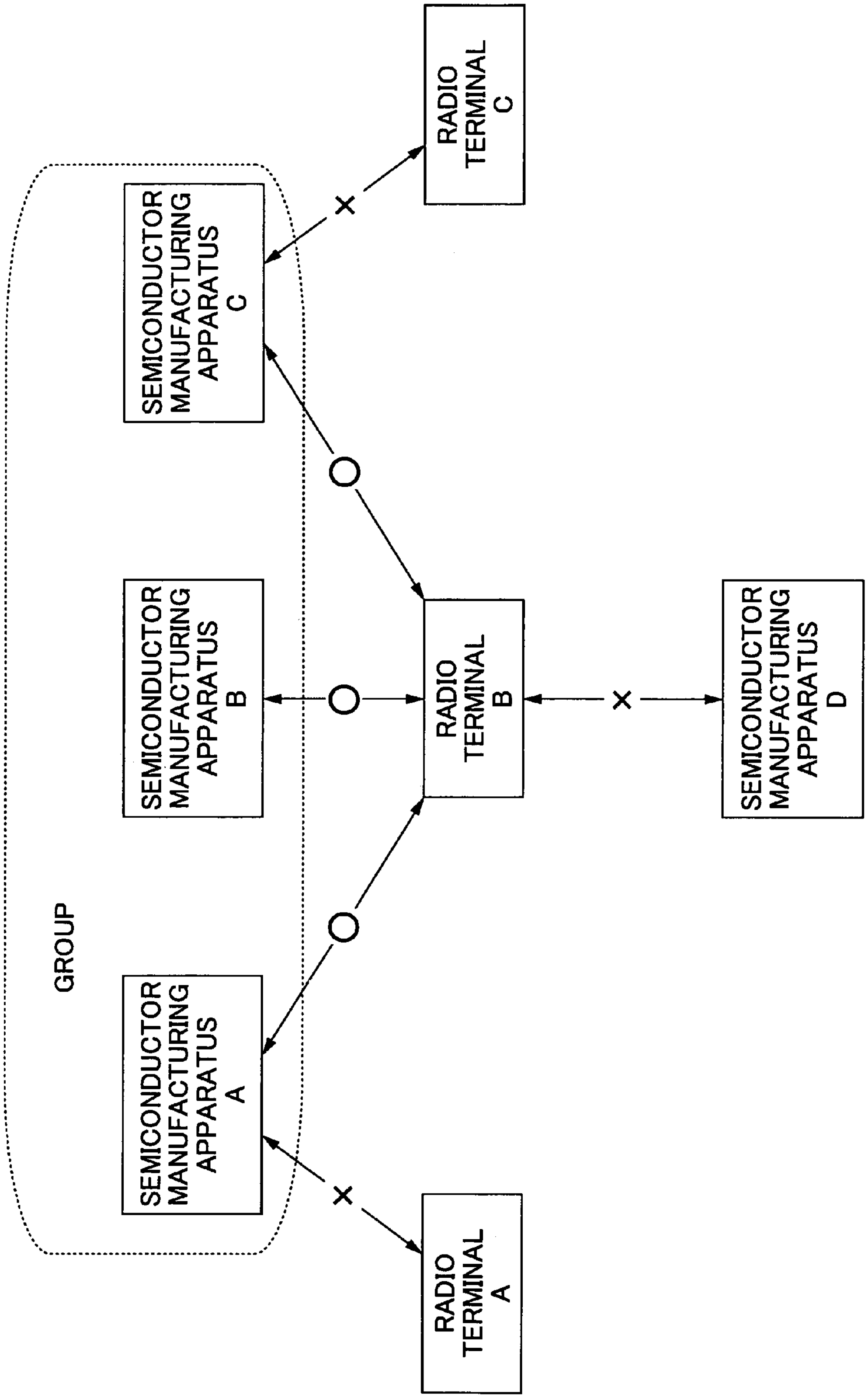
FIG. 7 illustrates a group connecting method according to a fourth embodiment of the present invention.

FIG. 7 illustrates a group connecting method according to a fourth embodiment of the present invention. The group connecting method is a connecting method for establishing radio communication connection from the radio terminal 2 simultaneously with a group of semiconductor manufacturing apparatuses previously grouped. As shown, the radio terminal and the semiconductor manufacturing apparatuses make connection simultaneously in a one-to-many correspondence relationship. In FIG. 7, an indication of ←○→ denotes a state in which radio communication connection has been established (or the establishment is permitted) between the radio terminal and the semiconductor manufacturing apparatuses, while an indication of ←X→ denotes a state in which establishment of radio communication connection is not permitted.

In the present example, the semiconductor manufacturing apparatuses A, B and C are previously made to belong to a common group, while the semiconductor manufacturing apparatus D does not belong to this group. Therefore, while the radio terminal B has established radio communication connection with the semiconductor manufacturing apparatuses A, B and C belonging to the group, the radio terminal B is not permitted to establish radio communication connection with the semiconductor manufacturing apparatus D. Further, the other radio terminals B and the radio terminal C are not permitted to establish radio communication connection in an overlapping manner with the semiconductor manufacturing apparatuses A, B and C belonging to the group already establishing the radio communication connection with the radio terminal A.

In the group connecting method according to the fourth embodiment of the present invention, as described above, connection request is made from the radio terminal to the group of the semiconductor manufacturing apparatuses previously grouped. Then, once radio communication connection is established between the single radio terminal and the group of the semiconductor manufacturing apparatuses, it becomes possible to give an instruction for a common operation to the group of the semiconductor manufacturing apparatuses and carry out the same thereon in a lump from the radio terminal. On the side of the radio terminal, a list of the group of the semiconductor manufacturing apparatuses which are on group connection therewith is displayed. Further, also in each of the group of the semiconductor manufacturing apparatuses on the group connection, the matter of being on the group connection may be displayed.

Cancellation of the group connection can be carried out individually on the side of each semiconductor manufacturing apparatus. Further, the radio terminal can cancel the group connection in a lump.

Figure 8:
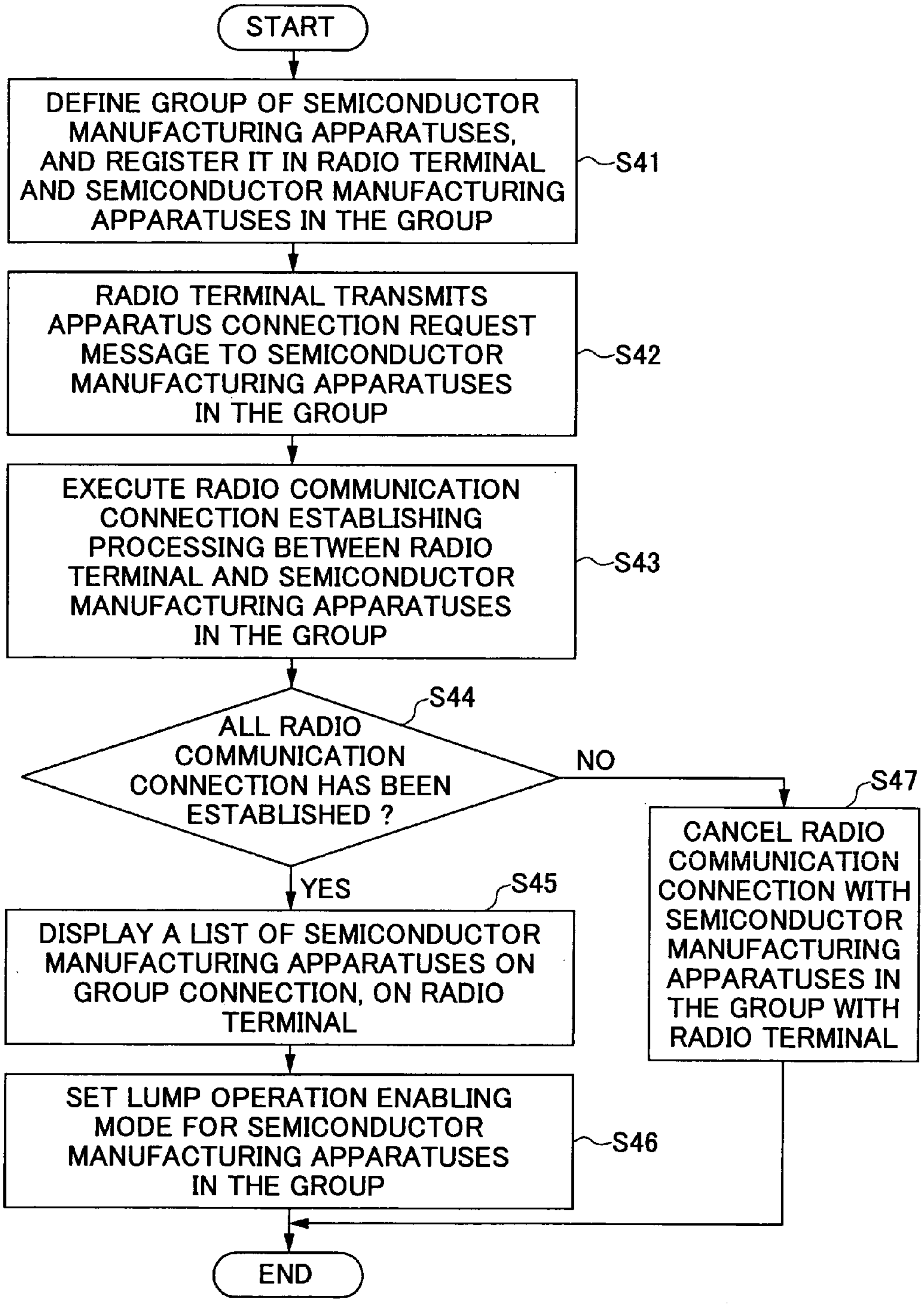
FIG. 8 shows a flow chart of group connecting processing according to the fourth embodiment of the present invention.

FIG. 8 is a flow chart of group connecting processing according to the fourth embodiment of the present invention such as that described above.

Step 41: A group of semiconductor manufacturing apparatuses is defined, and it is registered in the radio terminal and each of the semiconductor manufacturing apparatuses belonging to the group.

Step 42: Apparatus connecting request messages are transmitted from the radio terminal to the semiconductor manufacturing apparatuses belonging to the group.

Step 43: Processing of establishing radio communication connection between the radio terminal and the semiconductor manufacturing apparatuses belonging to the group is carried out.

Step 44: It is determined whether or not all the radio communication connection has been established. When it has been established, Step 45 is carried out. When it has not been established, Step 47 is carried out.

Step 45: On the side of the radio terminal, a list of the semiconductor manufacturing apparatuses on group connection is displayed.

Step 46: A lump operable mode for the respective semiconductor manufacturing apparatuses belonging to the group is set, and, on the side of each semiconductor manufacturing apparatus, the matter of being on the group connection is displayed.

Step 47: Since a semiconductor manufacturing apparatus for which radio communication connection cannot be established exists, the radio terminal cancels the radio communication connection with all the semiconductor manufacturing apparatuses belonging to the group.

The group connecting processing according to the fourth embodiment of the present invention is carried out according to the above-mentioned procedure. Such a group connecting method is advantageous in particular for adjusting operation such as setting a common parameter in the mechanism parts 50 of a plurality of the semiconductor manufacturing apparatuses.

Further, in Step 47, the radio terminal cancels the radio communication connection with all the semiconductor manufacturing apparatuses belonging to the group. However, it is possible to set the lump operable mode only in the semiconductor manufacturing apparatuses with which radio communication connection can be established.

Since the radio communication technology by Bluetooth is employed in the above-mentioned embodiments, the radio terminal can be used anywhere as long as it is set near (within 10 m) the semiconductor manufacturing apparatus. Thereby, it is possible to reduce the required number of radio terminals to a minimum necessary number. Also, a location in which the radio terminal can be used is not limited by a location of a connection connector, and thus, it is possible to improve the efficiency of adjusting operation carried out with the use of the radio terminal. Since the Bluetooth has characteristics such as that it uses a weak electric wave (an area within 10 m is covered by a weak electric wave), no interference occurs (it is robust against noise) or such, this technology is suitable to carry out the present invention.

Further, as the radio communication technology, other than the Bluetooth which has an interface specification of short distance radio communication on the order of 10 m, a wireless LAN carrying out communication wirelessly with the use of electric wave or light may be employed. Also, communication according to a PHS method may be utilized. The present invention is not limited by a type of a radio communication technology applied.

Furthermore, as the terminal apparatus, a PDA terminal or a PHS terminal having a communication function with Bluetooth may be utilized. The present invention is not limited by a type of a terminal apparatus.

Further, although description has been made for the semiconductor manufacturing apparatus, an apparatus according to the present invention is not limited to the semiconductor manufacturing apparatus, and, the present invention may be applied to any apparatus as long as it includes a mechanism part and a control part adjusting the mechanism part.

The apparatus adjusting methods of the semiconductor manufacturing apparatus adjusting systems according to the embodiments of the present invention mentioned above can be carried out by software (programs). The apparatus adjusting methods according to the embodiments of the present invention can be carried out as a result of the programs being executed by a CPU of a computer. The program produced is stored in a disk drive or such, and, can be installed in the computer if necessary; or is stored in a carriable recording medium such as a flexible disk, a memory card, a CD-ROM, or such, and, can be installed if necessary; or the program is installed with the use of a communication circuit or such, and after that, is executed by the CPU of the computer.

Thus, according to the various embodiments of the present invention, it becomes possible to operate the mechanism part of the apparatus from the terminal apparatus without providing a terminal apparatus for each apparatus, or providing a connecting connector for each apparatus in order to connect from a common single terminal apparatus in a switching manner.

Although the typical embodiments of the present invention have been described, the present invention are not limited to these embodiments, and various modifications and applications can be made without departing from the scope of the claims.

The invention claimed is:

1. An apparatus adjustable with radio communication of a manufacturing apparatus for manufacturing predetermined products, comprising:

an adjustable mechanism part included in the manufacturing apparatus and a control part connected with and adjusting said mechanism part, wherein:

said adjustable apparatus further comprises a radio communication part connected with said control part, establishing radio communication connection with a terminal and carrying out data transmission/reception to/from the terminal; and said control part comprises:

a part to produce state data indicating a state of said mechanism part to transmit to the terminal;

a part to analyze an instruction received from the terminal; and a part to adjust said mechanism part of said manufacturing apparatus based on the instruction analyzed.

2. The apparatus as claimed in claim 1, wherein:

said radio communication means is configured so that, when radio communication connection has been already established with the terminal, the radio communication means denies a request for radio communication connection from another terminal.

3. The apparatus as claimed in claim 1 or 2, further comprising:

a means to check a state of radio communication connection already established with the terminal; and a means to display the state of radio communication connection.

4. The apparatus as claimed in claim 1 or 2, further comprising:

a means to carry out emergency stop of said mechanism part when receiving an emergency stop instruction signal from the terminal with which radio communication connection has been established.

5. An apparatus adjusting system comprising: an apparatus comprising an apparatus comprising an adjustable mechanism part included in a manufacturing apparatus manufacturing predetermined products and a control part to adjust the mechanism part; and a terminal transmitting an instruction to adjust the mechanism part of said adjustable apparatus, wherein:

said adjustable apparatus further comprises a radio communication means part connected with the control means part, establishing radio communication connection with the terminal and carrying out transmission/reception of data to/from the terminal;

said control part comprises:

a part to produce state data indicating a state of said mechanism part to transmit to the terminal;

a part to analyze the instruction received from the terminal; and a part to adjust said mechanism part of said manufacturing apparatus based on the instruction analyzed; and said terminal comprises:

a radio communication part to carry out radio communication with said adjustable apparatus; and an interface part to display data from said apparatus and to input data for said adjustable apparatus.

6. The apparatus adjusting system as claimed in claim 5, wherein:

said radio communication means of said apparatus is configured so that, when radio communication connection has been already established with the terminal, the radio communication means denies a request for radio communication connection from another terminal.

7. The apparatus adjusting system as claimed in claim 5 or 6, wherein:

said radio communication means of said terminal is configured to establish radio communication connection with a plurality of apparatuses simultaneously, and be able to carry out radio communication with the plurality of apparatuses.

8. The apparatus adjusting system as claimed in claim 5 or 6, further comprising:

a means to check a state of radio communication connection already established between said apparatus and said terminal; and a means to display the state of radio communication connection between said apparatus and said terminal.

9. The apparatus adjusting system as claimed in claim 5 or 6, wherein:

said terminal further comprises:

a means to monitor whether or not a state from which emergency stop should be carried out on the mechanism part of said apparatus with which radio communication connection has been established occurs in said terminal; and a means to transmit to said apparatus an emergency stop instruction signal for carrying out emergency stop of said control part of said apparatus when it is detected that the state from which emergency stop should be carried out has occurred; and said apparatus further comprises:

a means to receive from the terminal with which radio communication connection has been established the emergency stop instruction signal, and to carry out emergency stop of said mechanism part.

10. An apparatus adjusting method for adjusting of an adjustable mechanism part provided in an adjustable apparatus included in a manufacturing apparatus for manufacturing predetermined products, from a terminal, comprising:

a step of transmitting a radio communication connection request message from said terminal to said adjustable apparatus;

a step of transmitting a radio communication connection check message from said adjustable apparatus to said terminal;

a step of establishing a radio communication connection between said terminal and said adjustable apparatus in a one-to-one correspondence relationship;

a step of transmitting a message for an instruction to adjust the mechanism part of said adjustable apparatus, from said terminal; and a step of adjusting the mechanism part of said manufacturing apparatus based on said message for the instruction to adjust, in said adjustable apparatus.

11. An apparatus adjusting method for adjusting of adjustable mechanism parts provided in adjustable apparatuses from a terminal, included in a manufacturing apparatus for manufacturing predetermined products, from a terminal, comprising:

a step of defining an apparatus group comprising a plurality of adjustable apparatuses;

a step of transmitting radio communication connection request messages from said terminal to said apparatus group of the plurality of adjustable apparatuses;

a step of transmitting radio communication connection check messages from adjustable apparatuses of said apparatus group to said terminal;

a step of establishing radio communication connection between said terminal and the adjustable apparatuses of said apparatus group, which have transmitted the radio connection check messages, in a one-to-many correspondence relationship;

a step of transmitting message for instructions to adjust the mechanism parts of said adjustable apparatuses, included in the manufacturing apparatus, with which radio communication connection has been established, from said terminal; and a step of adjusting the mechanism parts based on said messages for the instructions to adjust, in said adjustable apparatuses which have received said messages for the instructions to adjust.

12. The apparatus as claimed in claim 3, further comprising:

a means to carry out emergency stop of said mechanism part when receiving an emergency stop instruction signal from the terminal with which radio communication connection has been established.

13. The apparatus adjusting system as claimed in claim 7, further comprising:

a means to check a state of radio communication connection already established between said apparatus and said terminal; and a means to display the state of radio communication connection between said apparatus and said terminal.

14. The apparatus adjusting system as claimed in claim 7, wherein:

said terminal further comprises:

a means to monitor whether or not a state from which emergency stop should be carried out on the mechanism part of said apparatus with which radio communication connection has been established occurs in said terminal; and a means to transmit to said apparatus an emergency stop instruction signal for carrying out emergency stop of said control part of said apparatus when it is detected that the state from which emergency stop should be carried out has occurred; and said apparatus further comprises:

a means to receive from the terminal with which radio communication connection has been established the emergency stop instruction signal, and to carry out emergency stop of said mechanism part.

15. The apparatus adjusting system as claimed in claim 8, wherein:

said terminal further comprises:

a means to monitor whether or not a state from which emergency stop should be carried out on the mechanism part of said apparatus with which radio communication connection has been established occurs in said terminal; and a means to transmit to said apparatus an emergency stop instruction signal for carrying out emergency stop of said control part of said apparatus when it is detected that the state from which emergency stop should be carried out has occurred; and said apparatus further comprises:

a means to receive from the terminal with which radio communication connection has been established the emergency stop instruction signal, and to carry out emergency stop of said mechanism part.

16. The apparatus adjusting system as claimed in claim 13, wherein:

said terminal further comprises:

a means to monitor whether or not a state from which emergency stop should be carried out on the mechanism part of said apparatus with which radio communication connection has been established occurs in said terminal; and a means to transmit to said apparatus an emergency stop instruction signal for carrying out emergency stop of said control part of said apparatus when it is detected that the state from which emergency stop should be carried out has occurred; and said apparatus further comprises:

a means to receive from the terminal with which radio communication connection has been established the emergency stop instruction signal, and to carry out emergency stop of said mechanism part.

* * * * *